United States Patent
Broquere et al.

(10) Patent No.: US 7,802,248 B2
(45) Date of Patent: Sep. 21, 2010

(54) MANAGING A SERVICE HAVING A PLURALITY OF APPLICATIONS USING VIRTUAL MACHINES

(75) Inventors: Stéphane Broquere, Genéve (CH); Stefan Hochuli, Saint-Sulpice (CH); Vincent Fournie, Lausanne (CH); David Saradini, Lausanne (CH)

(73) Assignee: VMware, Inc., Palo Alto, CA (US)

( * ) Notice: Subject to any disclaimer, the term of this patent is extended or adjusted under 35 U.S.C. 154(b) by 1180 days.

(21) Appl. No.: 10/533,885

(22) PCT Filed: Nov. 10, 2003

(86) PCT No.: PCT/EP03/50809

§ 371 (c)(1),
(2), (4) Date: May 5, 2005

(87) PCT Pub. No.: WO2004/042575

PCT Pub. Date: May 21, 2004

(65) Prior Publication Data

US 2006/0041885 A1   Feb. 23, 2006

(30) Foreign Application Priority Data

Nov. 8, 2002   (EP) .................................. 02024884

(51) Int. Cl.
*G06F 9/455* (2006.01)
*G06F 9/46* (2006.01)
*G06F 15/16* (2006.01)
*G06F 15/173* (2006.01)

(52) U.S. Cl. ..................... 718/1; 718/104; 718/105; 709/201; 709/226

(58) Field of Classification Search ............. 718/1, 718/104–105; 709/201, 226
See application file for complete search history.

(56) References Cited

U.S. PATENT DOCUMENTS 6,397,242 B1   5/2002   Bugnion et al.
6,698,017 B1 *  2/2004   Adamovits et al. .......... 717/168
(Continued)

FOREIGN PATENT DOCUMENTS

EP   1083483 A1   3/2001
(Continued)

OTHER PUBLICATIONS

Sapuntzakis Et Al., "Optimizing the Migration of Virtual Computers", USENIX, OSDI 02 Paper, pp. 1-30, 2002.*
(Continued)

*Primary Examiner*—Meng-Ai An
*Assistant Examiner*—Jennifer N To

(57) ABSTRACT

The aim of this invention is to propose a method for allowing the use of several virtual machines including a plurality of applications and to federate these applications in order to form services. The method includes managing applications, making use of at least two physical machines linked by communication means. These machines comprise a physical structure on which a first software layer adapted to the physical machines is loaded. The machines also include a second layer forming a virtual layer on which virtual machines will operate. The second layer includes at least one application. The method includes loading a virtual machine control program associated with the virtual layer, connecting at least two physical machines to form a physical machine network, wherein the physical machine network includes the virtual layer, establishing a dialogue between the virtual machine control program and a system management process, defining a service containing several applications wherein the service is defined by the system management process, communicating between the management process and each of the virtual layer in order to determine the status of the virtual machines associated with the corresponding virtual layer and assigning a virtual machine to the corresponding virtual layer taking into account the characteristics of the application.

14 Claims, 2 Drawing Sheets

U.S. PATENT DOCUMENTS

| | | | |
|---|---|---|---|
| 7,174,381 B2 * | 2/2007 | Gulko et al. | 709/226 |
| 7,203,944 B1 * | 4/2007 | van Rietschote et al. | 718/104 |
| 7,603,670 B1 * | 10/2009 | van Rietschote | 718/1 |
| 2003/0005068 A1 * | 1/2003 | Nickel et al. | 709/208 |
| 2004/0010787 A1 * | 1/2004 | Traut et al. | 718/1 |
| 2004/0148605 A1 * | 7/2004 | Kim | 718/100 |
| 2004/0205179 A1 * | 10/2004 | Hunt et al. | 709/223 |
| 2004/0210623 A1 * | 10/2004 | Hydrie et al. | 709/201 |
| 2004/0268347 A1 * | 12/2004 | Knauerhase et al. | 718/1 |
| 2005/0160423 A1 * | 7/2005 | Bantz et al. | 718/1 |
| 2006/0025985 A1 * | 2/2006 | Vinberg et al. | 703/22 |

FOREIGN PATENT DOCUMENTS

| | | |
|---|---|---|
| WO | WO 01 35242 A | 5/2001 |
| WO | 2002/054224 | 7/2002 |

OTHER PUBLICATIONS

Anonymous: "VMware Workstation User's Manual Version 3.0" Online, Dec. 31, 2002, VMware, Inc., Palo Alto, USA XP 002244962P. pp. 1-9, 85-104, 175-238, 95-97, p. 199.

Anonymous: "Low Cost Systems Using Multiple Processors." IBM Technical Disclosure Bulletin, vol. 19, No. 8, Jan 1, 1977, pp. 2879-2883, XP002243686, New York, US.

* cited by examiner

MANAGING A SERVICE HAVING A PLURALITY OF APPLICATIONS USING VIRTUAL MACHINES

BACKGROUND

1. Field of the Invention

The present invention refers to the domain of machines connected to a telecommunication networks, in particular the management of virtual machines.

2. Description of the Related Art

The term virtual is very popular and generally refers to the modelling and simulation of a real system.

In the domain of computer machines, a classic example is the virtualization of a storage system.

In virtualization, instead of direct access to a hard disk, a machine accesses a virtual disk for which, the machine does not know the physical specifications. The storage requests are processed by a suitable interface that receives the storage or recovery demands and carries out the conversion to the physical disk(s). Furthermore, the hardware stock can be heterogeneous, for example, units of different types (magnetic disk, Flash memory etc) but the virtual representation is unique for a final user.

The principle is simple. When the storage capacity on this virtual unit exceeds the physical capacity, new physical units are added in a transparent way for the user.

Companies such as VMWare®, IBM® or Connectix® propose solutions that include software solutions towards a further step to virtualization, namely the creation of a complete virtual machine comprising the operational system part.

This solution allows sharing of a physical machine by creating several virtual machines, each virtual machine complying with suitable criteria in terms of storage means, calculation means and communication means.

The applications running on this type of virtual machine have the advantage of being easily transportable because they are independent of a physical machine. The virtual machine can be developed with the advancement of technology without requiring modifications to the applications.

As explained above, if more important requirements are highlighted for a given application, the physical machine is replaced and then the application is reactivated without any modification. The new display interface, network, etc., are processed in a specific way on the local layer of the virtual machine and a unique virtual image is defined for the application by the virtual machine.

This configuration simplifies the maintenance and the testing of new applications. In fact, the applications can operate transparently on several software environments running on the same virtual machine.

However, this configuration has limits since it is only applied on one machine. In the network configuration, a server is initialized by this virtual machine and several computers can operate different applications that can each be attached to a suitable operating system (Linux, Windows® 95/98, Windows® NT, etc.).

This virtuality presents limits because it takes into account that one machine and only one application level is possible.

SUMMARY

The aim of this invention is to propose a method allowing the use of several virtual machines including plurality of applications and allowing the federation of these applications for the formation of services.

This aim is achieved through a method for managing applications. The applications are managed by making use of at least two physical machines linked by communication means. These machines include a physical structure on which a first software layer adaptable to these machines is loaded, along with a second layer that forms a virtual layer on which virtual machines will operate. The second layer includes at least one application. The method includes the following steps: connecting at least two physical machines for the formation of a physical machine network, wherein the physical machine network includes virtual layers; loading a control program associated with the virtual layer of each physical machine; establishing a dialogue between the control program and a system management process; defining a service containing several applications, the service defined by the system management process; communicating between the system management process and each virtual layer in order to determine the status of the virtual machines associated with the corresponding virtual layer; and assigning a virtual machine to one of the virtual layers taking into account the characteristics of the application.

This method is thus based on the definition of a service that calls on one or more applications. It is to be noted that a virtual machine can include one or several applications. These virtual machines are disposed on a virtual layer and managed by a physical machine. The virtual layer is compatible with the virtual machine of the application. The role of the management process is to control each application in order to visualize the operation of a service containing several applications.

The management process can also determine if a service is active or available since it knows all the applications that forms said service. A service can, for example, be an e-commerce Internet site using a plurality of applications, such as a database application for a list of sale goods, an application for the presentation of information for the user interface part and an application for secure payment. Each of these applications, operating on a virtual machine, can be assigned to different virtual layers according to the requirements of these applications. The database application will require a large storage capacity while the presentation application will use rapid communication means.

The invention is placed at an application management level so that resources for these applications can be optimized. In a more general way, the invention allows the development of these applications in terms of storage capacity, communication means and computer performance.

In fact, the system management process carries out surveillance tasks of the applications and anticipates future requirements. In the case of the addition or replacement of a physical machine, the applications using this physical machine are redirected to other appropriate physical machines by the system management process. The system management process interrupts the application to relocate the data stored pertaining to this application from the old physical machine towards the new physical machine. Once this copy process has been made, the application is assigned to this new physical machine and can be reactivated.

The invention will be better understood based on the following detailed description that refers to the enclosed drawings that are given as a non-limitative example.

DETAILED DESCRIPTION

Figure 1:
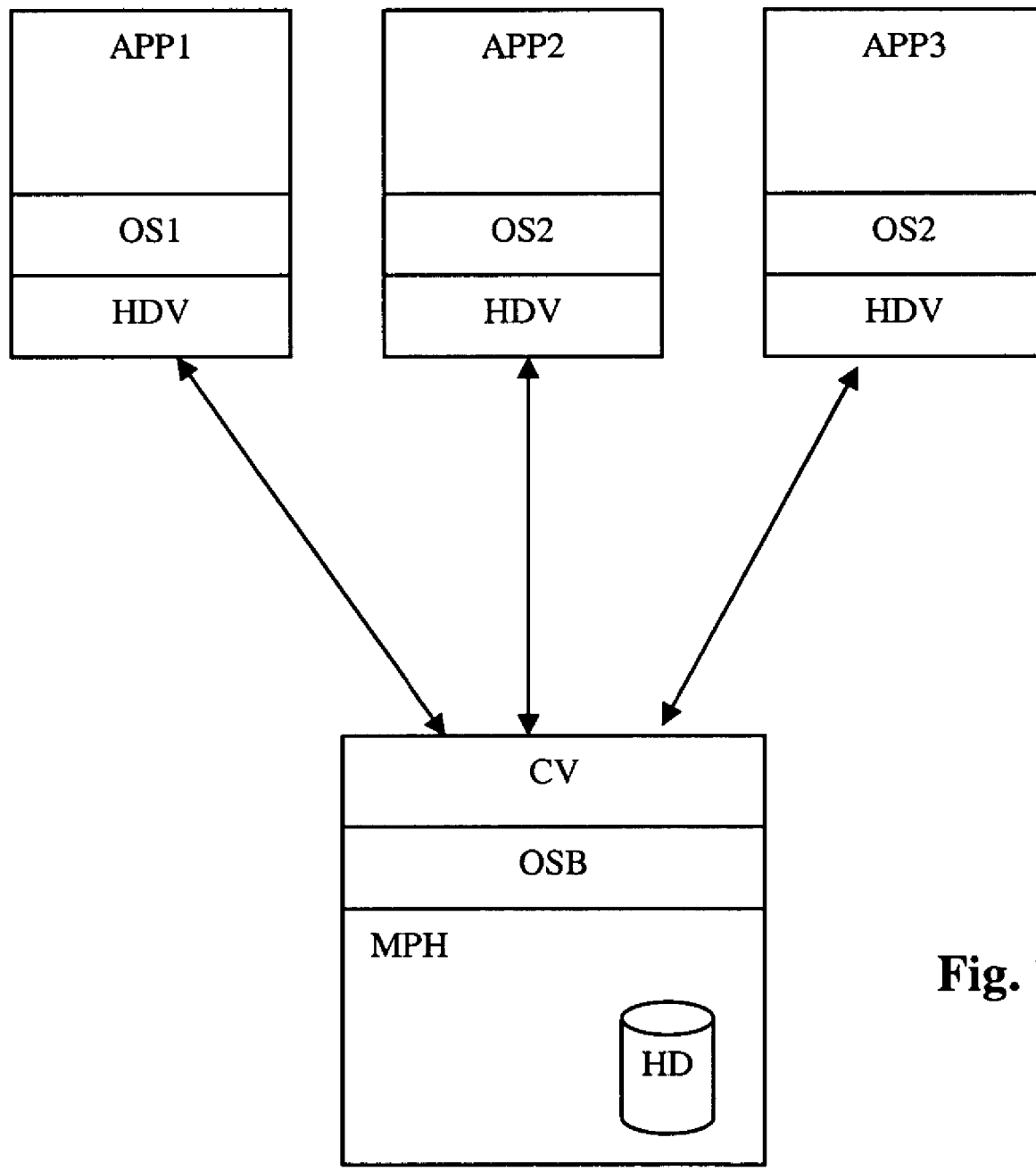
FIG. 1 describes the prior art for the operation of a virtual machine.

In FIG. 1, the configuration such as the one that is presently available is represented. The configuration includes a physical machine MPH on which an operating system OSB, such as Linux, Windows® NT/2000, is disposed. This operating system takes into account the physical configuration of the physical machine and manages the resources, such as the storage unit HD. This system is specific to the components used, that is to say that it disposes programs (driver) pertaining to the components concerned (display, network card, hard disk etc.).

Once the operating system is installed, a virtual layer CV is loaded that will allow access to a virtual machine. From this step, the operating system provides the capability to operate generic machines for which, regardless of the physical configuration, the behavior of these machines will be similar, in particular the interfaces towards the physical resources of the machine.

On this virtual layer, a plurality of virtual machines can be placed with each virtual machine comprising at least one application APP1, APP2, APP3 using different operating systems (0S1 and 0S2) according to the requirements. Access towards the virtual layer CV is carried out by means of a virtual material layer HDV. Taking the example of an access towards a serial port, the application APP1 accesses a virtual serial port pilot that releases all the functionalities that can be expected of such a program. This pilot transmits the instructions to the virtual layer that converts the instructions according to the serial port effectively installed therein.

This virtual machine configuration allows several applications to operate simultaneously using different software environments.

Figure 2:
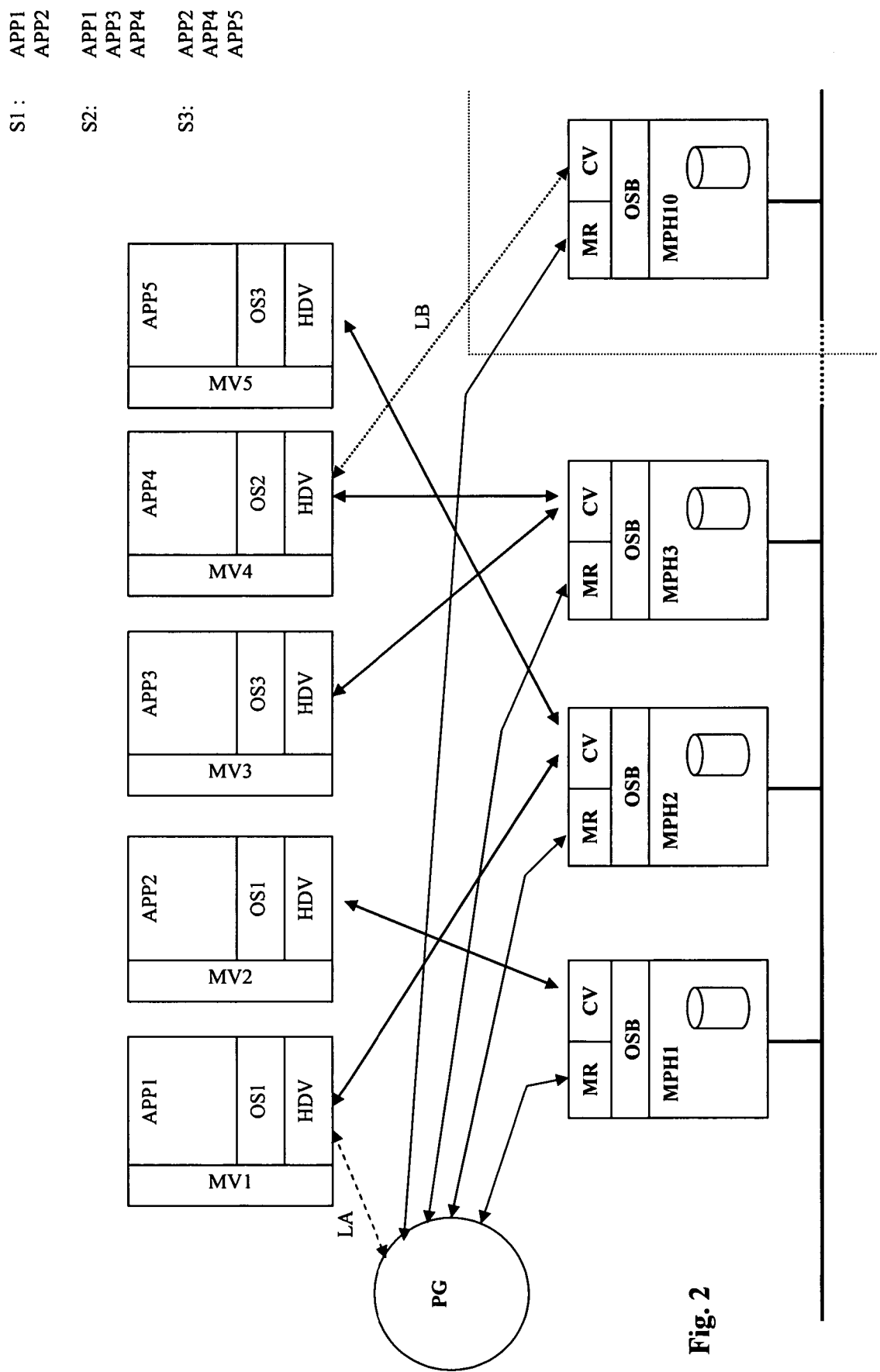
FIG. 2 describes the structure of the invention.

FIG. 2 shows the configuration of the invention in which two important innovations have been provided.

Associated to each virtual layer CV is a specific program for process control MR that is responsible for managing the operation of the virtual machine(s) MV using one or more physical machines. This process control MR is in relation and in addition to a management process PG that centralizes all the data related to different machines.

This management process PG has the following functions: registration of the physical machines MPH, their configurations and their status; assignation of the one or more applications APP to any of the virtual layers CV; supervision of operation of each virtual machine MV; stoppage of a virtual machine MV on a particular virtual layer and displacement towards another virtual layer. The displacement is accompanied by the displacement of the files pertaining to this virtual machine (database, programs); creation of service S1, S2, S3 depending on more than one application; supervision of service operation by the supervision of the applications APP or virtual machines MV that make up each service.

One of the first tasks of the process PG is the inventory of the modules on a given network. This inventory registers, on one hand, the physical machinery MPH, their configuration in terms of storage, processing and communication resources, and, on the other hand, the virtual machines MV with their applications APP intended to function on one of the physical machines MPH by means of the virtual layer CV.

Once the inventory has been carried out, the process PG defines the services containing several applications. The management process then assigns the different virtual machines to the physical machines, according to the requirements of each of the services associated with the virtual machine. The example of an e-commerce site is well suited to this kind of structure. Accordingly, the e-commerce site includes a first application, APP1, that comprises graphic interfacing with the user and the emphasis is placed on the broadband connection capacity. A second application, APP2, manages the database of products and clients. The second application is characterized by large storage means. The third application APP3 is a secure payment application. These three applications form the e-commerce service S1 and must be operational in order for the site to be considered in order.

The next step is the reactivation of the virtual machines or more generally a service that will bring about the reactivation of several virtual machines.

The concept of a service containing several applications allows for more detailed management. It is possible to associate the regulations, on one hand, on the applications comprising this service and, on the other hand, on the physical machines on which these applications function. It is to be noted that a service can request several identical applications that will have as operating conditions at least two different physical machines.

One of the important conditions related to a service is the cue to start the different applications. In fact, certain applications require the presence of other applications in order to operate and consequently cannot reactivate without the other applications.

Just like an application can be stopped, copied and reactivated, a service has the same properties. The copy of service will take into account the rules of the service. In the case where one of the working conditions is the requirement of two physical machines, the copy process will take into account this rule and will ensure that the application A operates on a different machine than application B.

The management process PG also includes dynamic surveillance of the service. According to the example of an Internet site that disposes of at least two user interface applications A and B and of a database application, if the process PG certifies that the activity of the applications A and B exceeds a limit value, this process will reactivate a new application C of the same type.

In the case of the replacement of the physical machine MPH3 on which the application APP3 operates through the virtual machine MV3, the process PG stops the virtual machine MV3 to assign it to the physical machine MPH2, for example. Before reactivating this virtual machine MV3, it is necessary for the payment data stored in the storage unit of the physical machine MPH3 to be transferred to the physical machine MPH2.

It should be noted that this data is directly connected to the application APP3 and forms an inseparable unit. The organization and the division of this data block is the task of the application itself.

Once the copy of the data has been carried out, the virtual machine MV3 and its application APP3 can reactivate and the service S1 becomes available again.

According to the type of embodiment, the virtual layer CV and the operating system OSB can only form one program. The functionalities are brought together simply in one single product instead of two but both functions exist, namely a layer connected to the hardware associated with the physical machine and a virtuality layer CV to offer a unique image to the external world.

Likewise, the specific program for process control MR can be directly included in the virtual layer CV.

The management process PG also includes optimization tools. In fact, it is possible that the operating cost of one machine differs from another machine according to the technology used and the backup means (uninterruptible power supply, RAID system) and it is possible to determine the operating cost of an application and consequently, in the same way, operating cost of a service.

Besides the physical characteristics of a machine, it is possible to take into account cost and security factors. This knowledge helps during the relocation of physical machines as represented by the physical machine MPH10. The dotted lines indicate that this physical machine is located in a different position than the other physical machines. Therefore, based on the configuration of the invention, it is possible to assign virtual machines not only to the physical machines connected locally but also to the physical machines that are physically installed on other sites, according to the dotted line LB.

This possibility opens new prospects in terms of the management of computing equipment. In fact, external resources are in competition with internal resources. The only constraints are to be found at the communication means level and the presence of the same virtuality layer offered by local machines in the relocated machines.

At the time of the configuration of an application, the attached parameters of the physical machine, such as the cost per storage unit, the transferred packet or CPU time, as well as the security level are taken into account. It is possible at the time of the configuration of a virtual machine to prohibit the application from being relocated, for security reasons for example.

The management process PG uses relation means in order to establish statistics regarding the use of the virtual machines and the applications. This tool allows anticipation of a request and allows the development of the computing equipment before being faced with the overloading of the system, in one embodiment.

In another embodiment, the virtual layer does not have an aim of creating a virtual machine but rather has the aim to allow the execution of a specific program.

This is the case, for example, for machines with a Java™2 Platform Enterprise Edition (J2EE™) layer on which applications using a module Enterprise Java Bean (EJB) function, in one embodiment. According to the invention, the process control program MR is installed on the physical machine and communicates with this execution layer J2EE™. Functionally, the execution layer is identical to the virtual machines, namely that the management process PG registers the physical machines as well as the applications and establishes the catalogue of physical machines. The physical machines have an interpreter of a particular type and applications that require this type of interpreter.

The role of the management process is thus to operate in a heterogeneous format in which physical machines are activated with virtual layers for operating virtual machines and other machines are activated according to particular environments such as J2EE™.

Once the registration has been carried out, the management process PG allocates the operation of an application according to the environment desired by the application.

According to one particular embodiment, illustrated by the arrow LA in FIG. 2, the management process PG also communicates directly with the virtual machine through a suitable control program. Therefore, even before accessing the resources of a virtual layer CV, the process knows the status of the application that operates on this machine and can in this way access a higher quality control application. In fact, by directly accessing the virtual machine, it is possible to manage several applications on the same virtual machine. Although the virtual machine is assigned to a virtual layer of a physical machine, there may be several applications operating on this virtual machine. The requirements of each application on the interior of the same virtual machine as well as the statistics will be established by an application rather than by a virtual machine.

The invention claimed is:

1. A method for managing applications, making use of at least two physical machines linked by communication means, the method comprising:

connecting the at least two physical machines to form a physical machine network, wherein each of the physical machines comprise a physical structure on which is loaded a first software layer adaptable to the corresponding physical machine as well as a second layer forming a virtual layer on which virtual machines will operate, the virtual machine comprising at least one application, each physical machine associated with a plurality of attached parameters;

loading a control program to the virtual layer of each physical machine;

establishing a dialogue between the control program and a system management process;

defining a service containing a plurality of applications, the service defined by the system management process;

communicating between the system management process and each virtual layer in order to determine the status of the virtual machines associated with said virtual layer;

assigning a virtual machine to the corresponding virtual layer taking into account one or more characteristics of the application associated with the corresponding virtual layer and one or more of the plurality of attached parameters associated with the physical machines, wherein the virtual machine is independent of the corresponding physical machine the assigning of the virtual machine enabling optimization of resources at the physical machines based on one or more characteristics of the application and the one or more attached parameters of the physical machines.

2. The method according to claim 1, wherein loading the control program includes determining status of each physical machine on which a virtual layer is placed and communicating the status of each physical machine to the system management process by communication means.

3. The method according to claim 1, wherein loading the control program further includes determining status of each virtual machine associated with the virtual layer of the corresponding physical machine and communicating the status of each virtual machine to the system management process by communication means.

4. The method according to claim 1, wherein the system management process further includes:

determining one or more characteristics of the virtual machines and of one or more resources necessary for operating the virtual machines;

performing surveillance of the status of each virtual machine using the control program;

associating the status to each virtual machine forming the service; and transmitting the status of each virtual machine associated with the service to an operator.

5. The method according to claim 4, wherein the system management process further includes, when the virtual machine is to be relocated from a first physical machine to a second physical machine, transmitting a stop instruction to the control program available at the first physical machine;

identifying data pertaining to the stopped virtual machine located on the first physical machine;

transferring the identified data to the second physical machine;

assigning the virtual machine to the second physical machine; and reactivating the virtual machine.

6. The method according to claim 5, wherein upon successful reactivation of the virtual machine, the system management process further includes, transmitting an instruction to the control program of the first physical machine to suppress the data pertaining to the virtual machine.

7. The method according to claim 5, wherein the system management process further includes, defining one or more operating constraints for the one or more virtual machines associated with a service, wherein the assigning of a virtual machine to a virtual layer of a physical machine and the relocation of said virtual machine to another virtual layer associated with the second physical machine takes into account the one or more operating constraints.

8. The method according to claim 1, wherein the assigning of the virtual machine to the virtual layer further includes assigning the virtual machine to the virtual layer associated with a physical machine that is either local or remote.

9. A method for managing applications, comprising:

establishing a communication link between at least two physical machines to define a physical machine network, the physical machines having a system management process to manage physical resources available at the corresponding physical machines, each of the physical machine associated with a plurality of attached parameters;

defining a virtual layer for each physical machine, the virtual layer providing an interface to the physical machines to access the physical resources of the physical machines, each virtual layer having a control program to communicate with the system management process;

defining services for specific ones of the virtual layer associated with the physical machine of the physical machine network, the service including at least one application;

defining at least one virtual machine associated to selected physical machines using the virtual layer, the virtual layer associated with the service;

monitoring inventory of the physical machines and the virtual machines, the inventory identifying resources available at the physical machines and resources required at the virtual machines of the physical machine network; and assigning at least one of the virtual machines to a corresponding physical machine based on resource requirement of the application associated with the service and one or more of the plurality of attached parameters associated with the physical machines, wherein the virtual machine is independent of the corresponding physical machines, the assigning of the virtual machine enabling optimal allocation of inventory at the physical machines based on one or more characteristics of the application and the one or more attached parameters of the physical machines.

10. The method of claim 9, wherein the system management process further includes, anticipating resource requirements of the application associated with the service; and developing resources at the physical machine network to address the resource requirements of the application such that the physical machine network is able to handle the resource requirement load of the service.

11. The method of claim 9, further includes replacing a physical machine in the physical machine network, the replacement includes, suspending operation of the virtual machine executing at the virtual layer associated with the physical machine identified for replacement;

identifying data associated with the virtual machine at the physical machine, the data directly associated with the application executing at the virtual machine;

transferring the identified data to a different physical machine;

associating the virtual machine corresponding to the transferred data to the different physical machine; and activating the virtual machine so as to execute the application at the virtual layer associated with the different physical machine using the data and resources at the different physical machine.

12. A method for managing applications, comprising:

defining a physical machine network by communicatively connecting at least two physical machines, the physical machines having a system management process to manage physical resources available at the corresponding physical machines, each of the physical machine associated with a plurality of attached parameters;

providing a virtual layer on each physical machine, the virtual layer including at least an application that is executed using at least one of a plurality of virtual machines;

associating a control program to the virtual layer on each of the physical machines, the control program managing the operation of the plurality of virtual machines;

coupling the system management process to each virtual layer in the physical machine network, the coupling enabling dialogue between the system management process and the corresponding control program of each virtual layer, wherein the dialogue includes determining status of the physical machines and the plurality of virtual machines within the physical machine network, establishing resource availability at the physical machines and resource requirements of the plurality of virtual machines; and associating selected ones of the plurality of virtual machines to the virtual layer of particular physical machines within the physical machine network based on the characteristic requirements of the application available at the virtual layer of the particular physical machines and one or more of the plurality of attached parameters associated with the physical machines, wherein each of the plurality of virtual machines is independent of the corresponding physical machines, the assigning of the virtual machine enabling optimization of resources at the physical machines.

13. The method of claim 12, further includes, defining a service containing a plurality of applications; and supervising operation of the service by one of supervising each of the applications or supervising each of the virtual machines that execute each of the applications.

14. The method of claim 12, further includes relocating a virtual machine from a first physical machine to a second physical machine within the physical machine network, the relocation includes, suspending operation of the selected ones of the plurality of virtual machines associated with the first physical machine;

dissociating the control program at the virtual layer of the first physical machine from the corresponding selected ones of the plurality of virtual machines;

identifying data associated with the application executed on the selected ones of the plurality of virtual machines at the first physical machine;

transferring the data associated with the selected ones of the plurality of the virtual machines from the first physical machine to the second physical machine;

providing a virtual layer at the second physical machine, the virtual layer including an application to be executed by the selected ones of the plurality of the virtual machines;

assigning the selected ones of the plurality of the virtual machines to the virtual layer at the second physical machine, the assigning includes associating a control program to the virtual layer at the second physical machine so as to manage the operation of the selected ones of the plurality of the virtual machines by establishing dialogue between the system management process and the control program; and activating the selected ones of the plurality of the virtual machines so that the selected ones of the plurality of the virtual machines can execute the application at the virtual layer using the resources and data available at the second physical machine.

* * * * *